US007016181B2

(12) United States Patent  
Ito et al.

(10) Patent No.: US 7,016,181 B2  
(45) Date of Patent: Mar. 21, 2006

(54) INFORMATION PROCESSING APPARATUS HAVING MAGNESIUM BODY AND PRINTED CIRCUIT BOARD

(75) Inventors: Katsunori Ito, Kawasaki (JP); Masahiko Kyouzuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 10/458,788

(22) Filed: Jun. 10, 2003

(65) Prior Publication Data

US 2004/0001309 A1 Jan. 1, 2004

(30) Foreign Application Priority Data

Jun. 11, 2002 (JP) .............................. 2002-170408

(51) Int. Cl.
*G06F 1/16* (2006.01)
(52) U.S. Cl. ...................... 361/683; 361/680; 361/681; 361/684; 248/122.1; 248/917; 345/169
(58) Field of Classification Search ........ 361/680–683, 361/685–687, 730, 755, 807–810; 164/113, 164/119; 248/122.1, 346.1, 917–918, 489, 248/510, 289.1, 296, 278, 279, 459, 124.1; 312/223.1, 223.2, 223.3, 235 A; 403/93, 403/94, 97, 106; 345/169, 905; 343/702; 360/97.01, 98.01
See application file for complete search history.

(56) References Cited

U.S. PATENT DOCUMENTS

| | | | | | |
|---|---|---|---|---|---|
| 5,100,098 | A | * | 3/1992 | Hawkins | ................... 248/291.1 |
| 5,619,397 | A | * | 4/1997 | Honda et al. | ................ 361/686 |
| 5,899,421 | A | * | 5/1999 | Silverman | .................... 248/175 |
| 6,101,087 | A | * | 8/2000 | Sutton et al. | ................ 361/686 |
| 6,625,013 | B1 | * | 9/2003 | Minaguchi et al. | .......... 361/683 |
| 6,674,636 | B1 | * | 1/2004 | Loo | ............................ 361/680 |
| 6,819,547 | B1 | * | 11/2004 | Minaguchi et al. | .......... 361/680 |
| 2003/0222149 | A1 | * | 12/2003 | Solomon et al. | ........ 235/472.01 |

FOREIGN PATENT DOCUMENTS

| | | |
|---|---|---|
| JP | 5-1606 | 1/1993 |
| JP | 2001-7544 | 1/2001 |
| JP | 2001014061 | 1/2001 |

* cited by examiner

*Primary Examiner*—Michael Datskovskiy
(74) *Attorney, Agent, or Firm*—Greer, Burns & Crain, Ltd.

(57) ABSTRACT

An information processing apparatus such as a tablet PC has a rectangular magnesium body. Molded resin components are attached to the body, and have respective functions and engaging portions for releasably securing the body to a docking unit. The information processing device can be used while it is held with a hand or while it is attached to the docking unit. Molded resin components can make sliding contact with the docking unit, but the magnesium body will not make sliding contact with the docking unit and, therefore, the weak points of the magnesium body can be overcome.

7 Claims, 18 Drawing Sheets

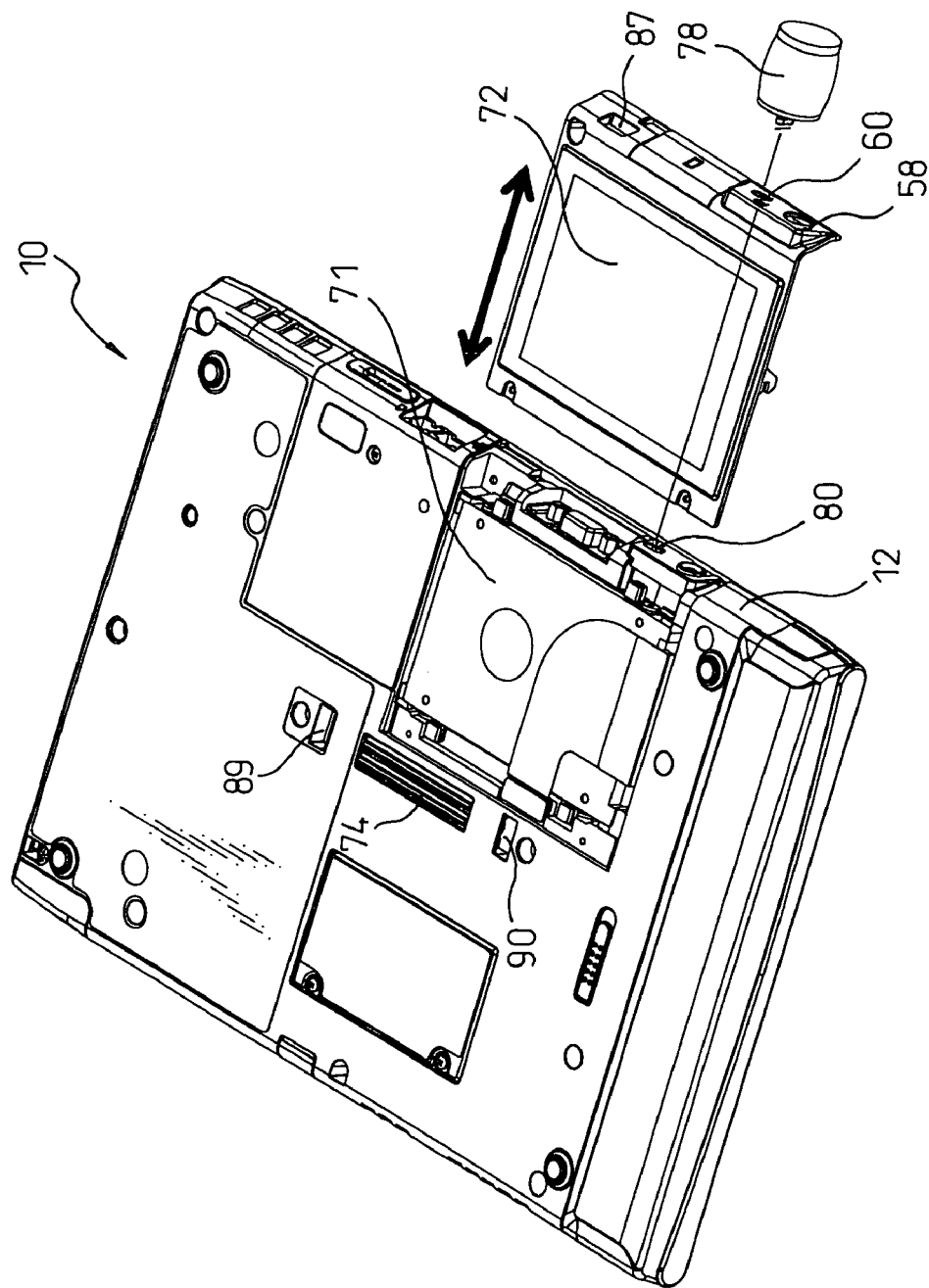

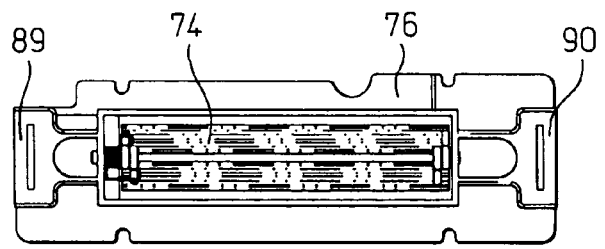 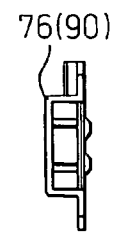
Fig.15A  Fig.15B
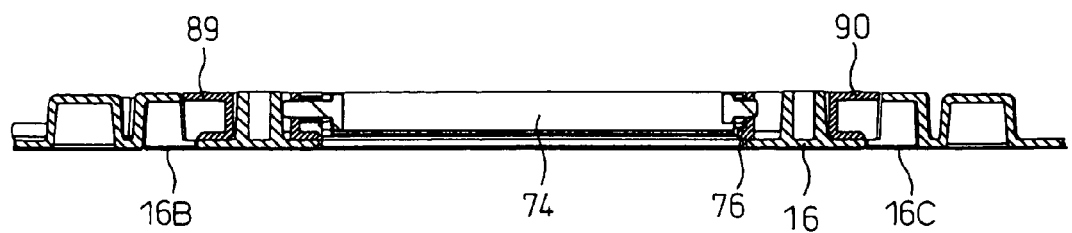
Fig.16

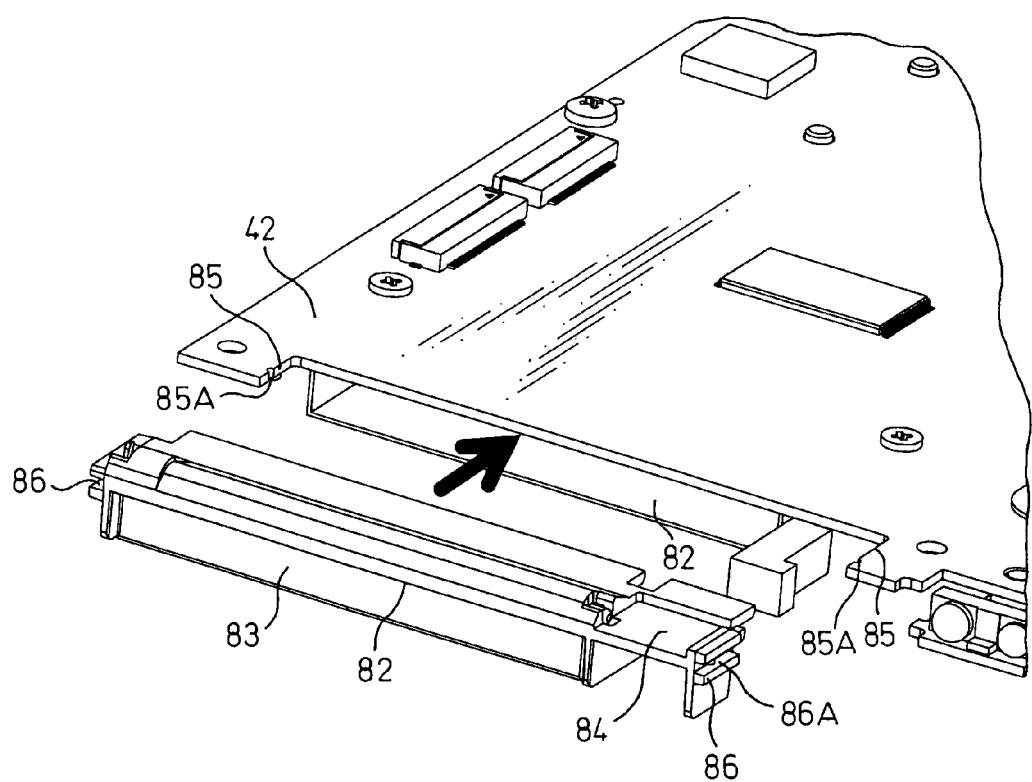

INFORMATION PROCESSING APPARATUS HAVING MAGNESIUM BODY AND PRINTED CIRCUIT BOARD

BACKGROUND OF THE INVENTION

1. Field of the Invention

The present invention relates to an information processing apparatus and a printed circuit board.

2. Description of the Related Art

A tablet PC is a flat plate-like rectangular personal computer to which information or data can be input with a pen. The tablet PC can be used while being held with a hand or being supported by a docking unit.

The tablet PC is required to be as thin and light as possible because it is used while being held with one hand. For this reason, the body of the tablet PC is made of magnesium. Magnesium is suitable for the thin and light body because of high strength. The magnesium body is coated with paint or is surface-treated. However, if the magnesium body makes sliding contact with another component, the paint coating provided on the magnesium body is apt to peel off, or the surface of the magnesium body is apt to be damaged. If the coating peels off or the surface is damaged, the body is apt to corrode. For this reason, it is required to avoid the weak points of magnesium while taking advantage of the strong points of magnesium.

Furthermore, the tablet PC is tied to a desk or the like by using a theft-prevention lock by which the tablet PC is locked. On the other hand, a cover covering a storage device (HDD) is attached to the tablet PC, and the cover is fixed to the body of the tablet PC by a theft-preventing lock. If the cover is made of a molded resin component and the thickness of the wall is small, the strength of the cover with respect to the lock is not sufficient, and two kinds of locks are thus required.

Furthermore, a flap capable of opening and closing a PC card slot is directly attached to the body of the tablet PC, or a flap unit supporting such a flap is attached to the body of the tablet PC In case that the flap is directly attached to the body of the tablet PC, the body is required to have holes in a direction perpendicular to the direction in which the molding die for producing the body is removed. If the flap unit supporting the flap is attached to the body of the tablet PC, an accurate positional relationship between the flap unit and the printed circuit board is required for the engagement of the connectors.

SUMMARY OF THE INVENTION

It is therefore an object of the present invention to provide an information processing apparatus and a printed circuit board in which the problem of a magnesium body can be solved.

An information processing apparatus, according to the present invention, comprises a magnesium body, and a molded resin component attached to the body, the molded resin component having an engaging portion for releasably securing the body to a docking unit.

In this configuration, the body of the information processing apparatus is made of magnesium, and the molded resin component is attached the body. The molded resin component has a portion realizing a function of a tablet PC, and an engaging portion for releasably securing the body to a docking unit. The engaging portion makes contact or sliding contact with an engaging portion of the docking unit when the body is attached to or detached from the docking unit. However, as the engaging portion of the body is made of resin, the paint coating provided on the magnesium body does not peel off, and the surface of the magnesium body is not damaged.

Furthermore, an information processing apparatus, according to the present invention, comprises a magnesium body, a molded resin component attached to the body, and a docking unit for releasably supporting the body to the docking unit, the molded resin component having an engaging portion for releasably securing the body to the docking unit. This information processing apparatus has the same advantage as that described above.

Furthermore, an information processing apparatus, according to the present invention, comprises a magnesium body, a storage device, a molded resin cover covering the storage device, and a lock for locking the cover to the body, the lock being arranged to lock the cover together with the body.

In this configuration, the body of the information processing apparatus is made of magnesium, and the cover covering the storage device is made of a molded resin component. The cover covering the storage device is locked along with the magnesium body by the lock. The lock is called a security key, which ties the magnesium body to a desk or the like, so that the information processing apparatus (tablet PC) cannot be taken away. Even if the tablet PC is tied to a desk, if the cover of the storage device can be opened, the storage device such as a HDD may be stolen. The storage device such as a HDD is very important for the user of the tablet PC and the user is greatly troubled when it is stolen. In the above configuration, the cover covering the storage device is locked with the magnesium body by the lock and, thereby, it cannot be opened and the storage device such as a HDD cannot be stolen. As the cover covering the storage device and the magnesium body are locked together by the lock, the cover is reinforced by the magnesium body to compensate for the insufficient strength of the cover.

Furthermore, a printed circuit board, according to the present invention, is disposed in a body of an information processing apparatus and comprises a flap unit supporting a flap, which is capable of opening and closing a PC card slot provided in the body, at a position where the flap faces the PC card slot.

In this configuration, the flap unit is made of, for example, a molded resin component. A flap or flap unit is usually attached to the body, but the flap unit in this configuration is attached to the printed circuit board. For this reason, the flap unit can be positioned accurately with respect to the printed circuit board, and when a PC card is inserted into the PC card slot, a connector of the PC card can be connected to a connector of the printed circuit board without any problem.

BRIEF DESCRIPTION OF THE DRAWINGS

The present invention will become more apparent from the following description of the preferred embodiments, with reference to the accompanying drawings, in which:

FIG. 14 is a view showing the tablet PC in the state in which the cover covering the storage device (HDD) is in the opened position;

FIG. 15A is a plan view showing the flap base having a flap;

FIG. 15B is a side view of the flap base;

FIG. 16 is a cross-sectional view of the flap base and the lower cover, taken in the longitudinal direction of the flap base;

FIG. 19 is the perspective view showing the flap unit which is being attached to the printed circuit board.

DESCRIPTION OF THE PREFERRED EMBODIMENTS

The preferred embodiments of the present invention in which an information processing apparatus is applied to a tablet PC will be described below with reference to the attached drawings. First, the fundamental configuration of a tablet PC is explained with reference to FIGS. 1 to 9.

Figure 1:
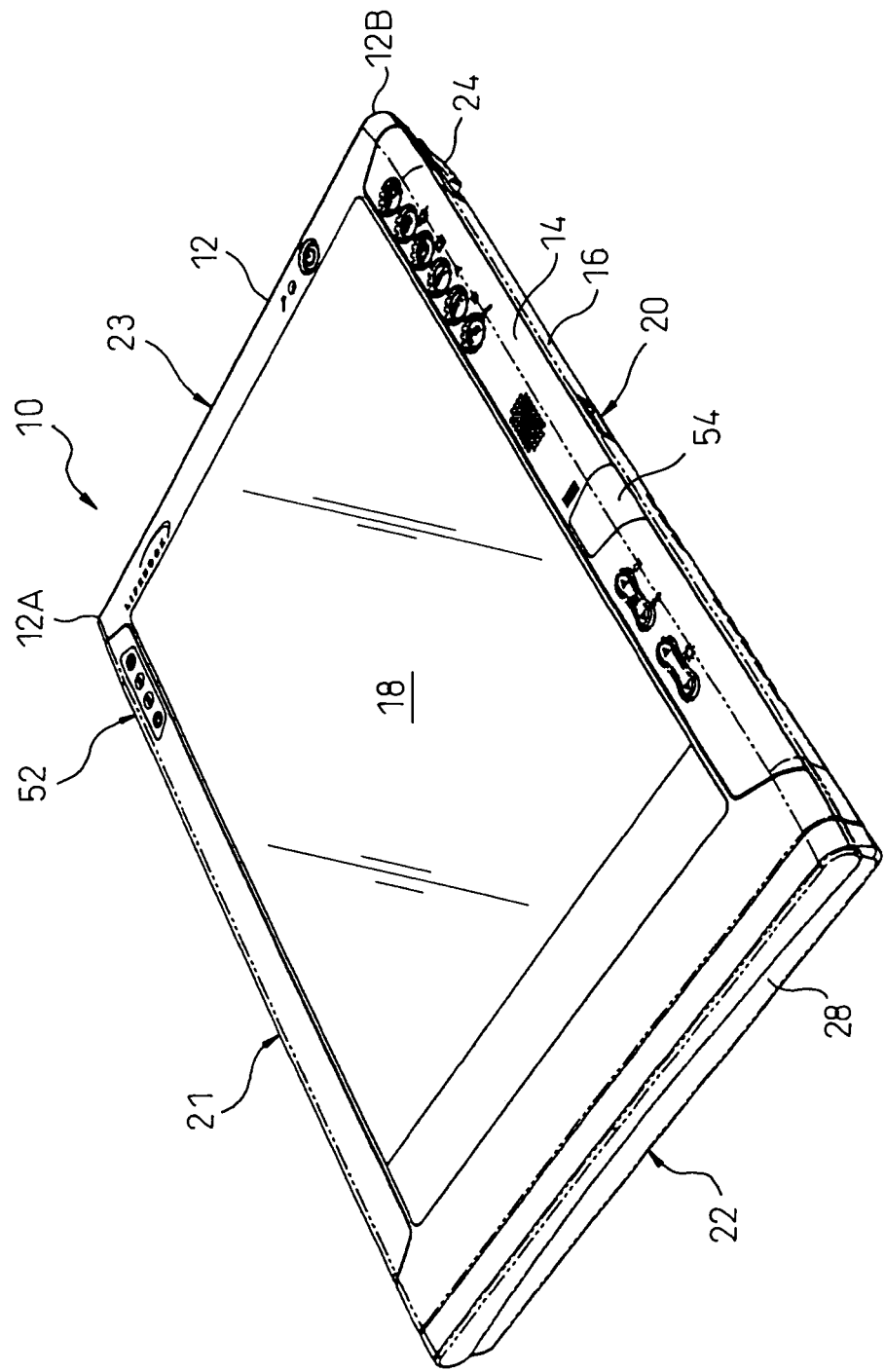
FIG. 1 is a perspective view of a tablet PC according to an embodiment of the present invention.
Figure 2:
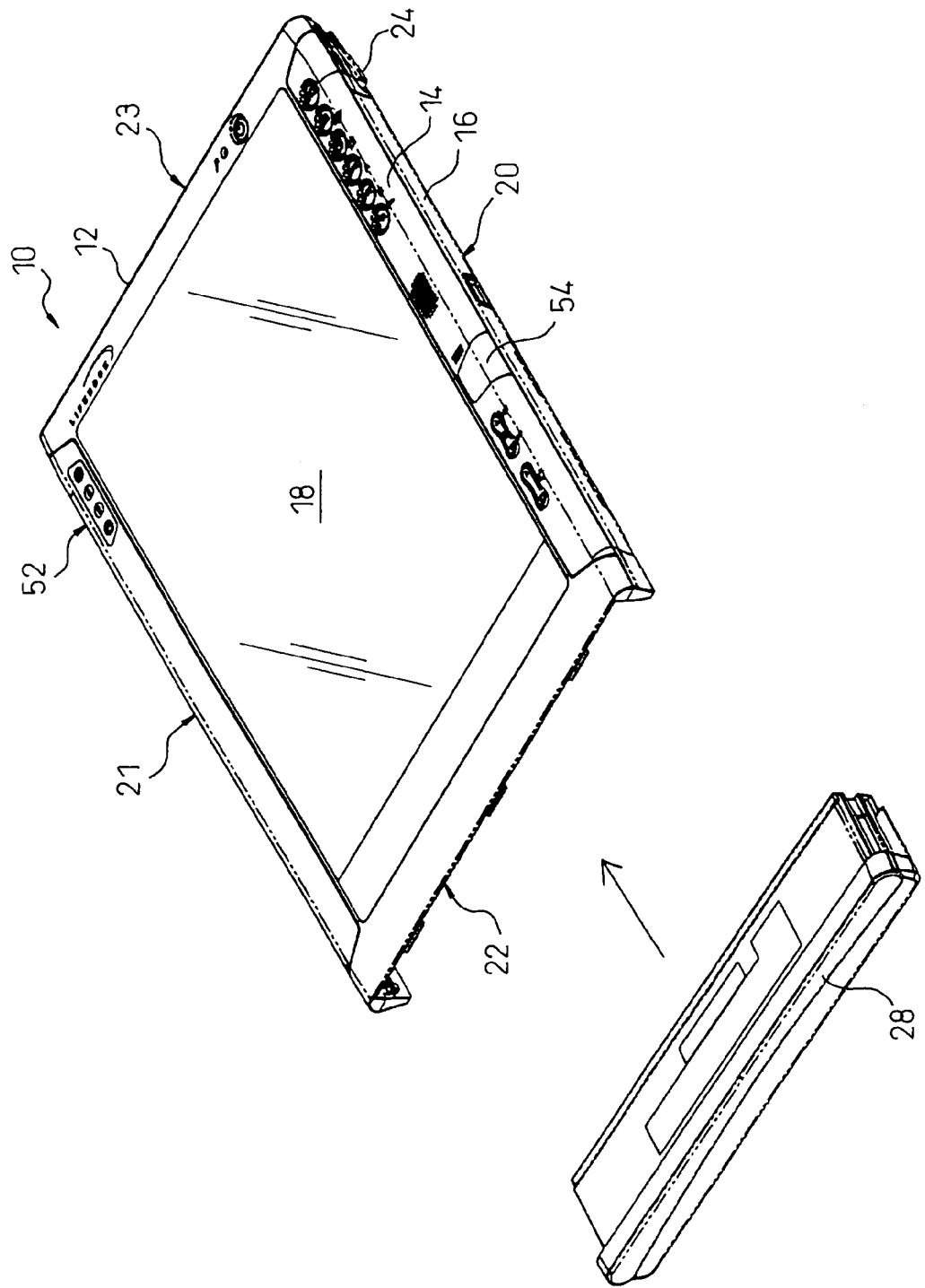
FIG. 2 is a perspective view of the tablet PC of FIG. 1, in the state in which the battery is removed from the body.
Figure 3:
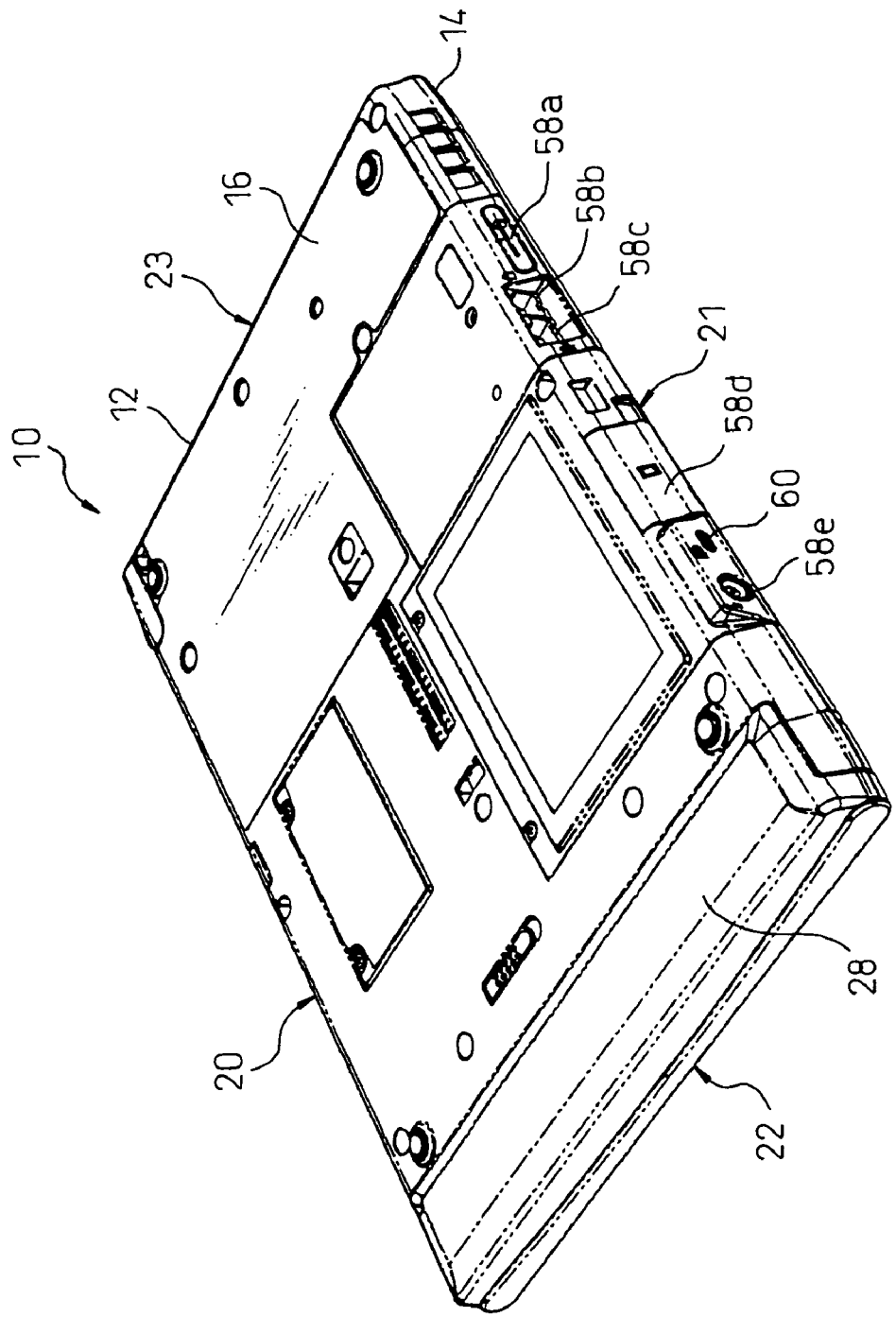
FIG. 3 is a perspective bottom view of the tablet PC of FIG. 1.
Figure 4:
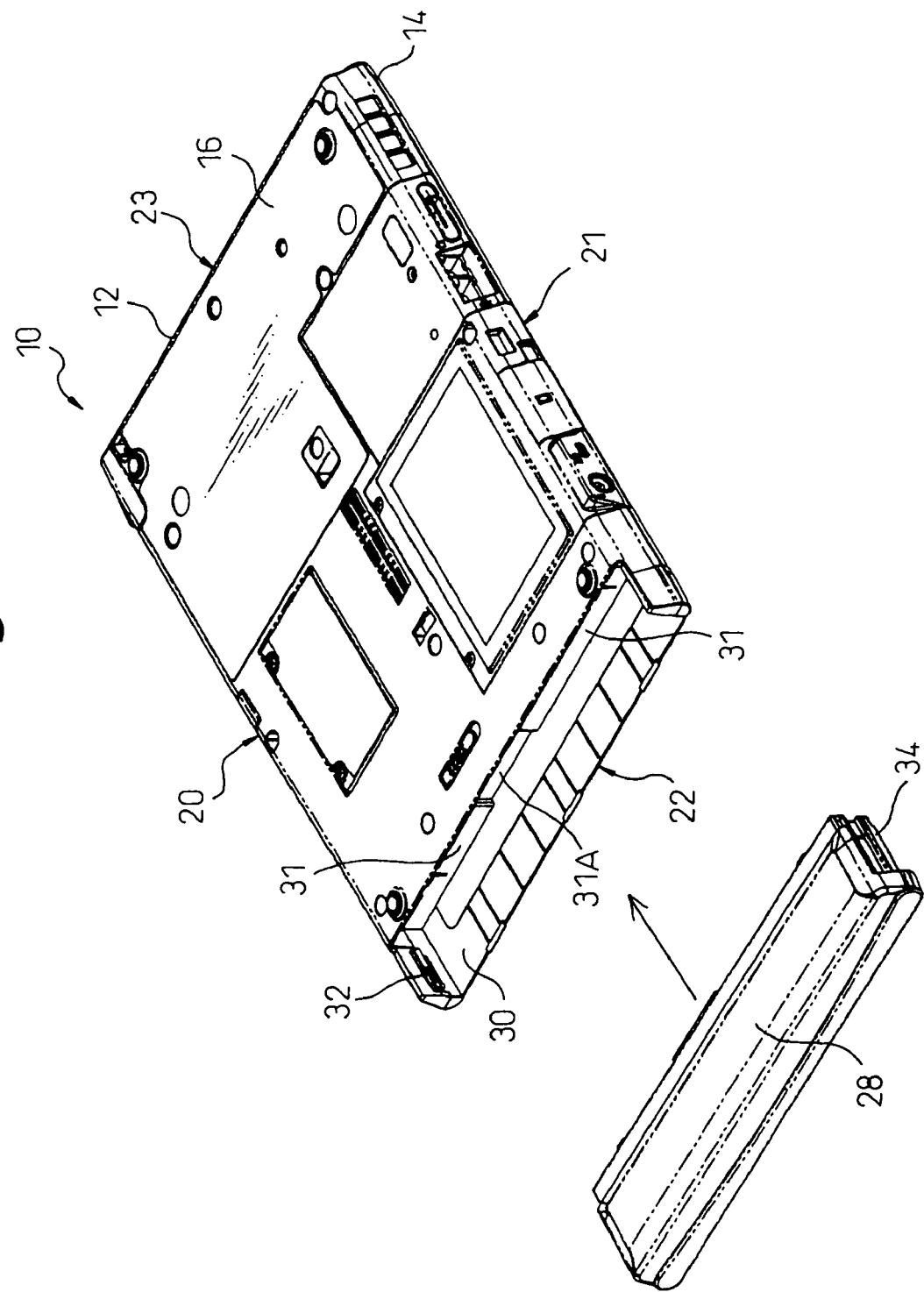
FIG. 4 is a perspective bottom view of the tablet PC of FIG. 3, in the state in which the battery is removed from the body.

FIG. 1 is a perspective view of a tablet PC according to an embodiment of the present invention, and FIG. 2 is a perspective view of the tablet PC, shown in FIG. 1, in the state in which the battery is removed from the body. FIG. 3 is a perspective bottom view of the tablet PC shown in FIG. 1, and FIG. 4 is a perspective bottom view of the tablet PC of FIG. 3, in the state in which the battery is removed from the body.

The tablet PC 10 shown in FIGS. 1 to 4 has a flat plate-like rectangular body 12. The body 12 comprises a lower cover 16 and an upper cover 14 covering the lower cover 16. A display portion 18 is provided on the surface of the body 12. Electronic components (not shown) and a printed circuit board are disposed in the body 12. The body 12 has a first long side portion 20 and a second long side portion 21 opposed to each other, and a first short side portion 22 and a second short side portion 23 opposed to each other.

Figure 5:
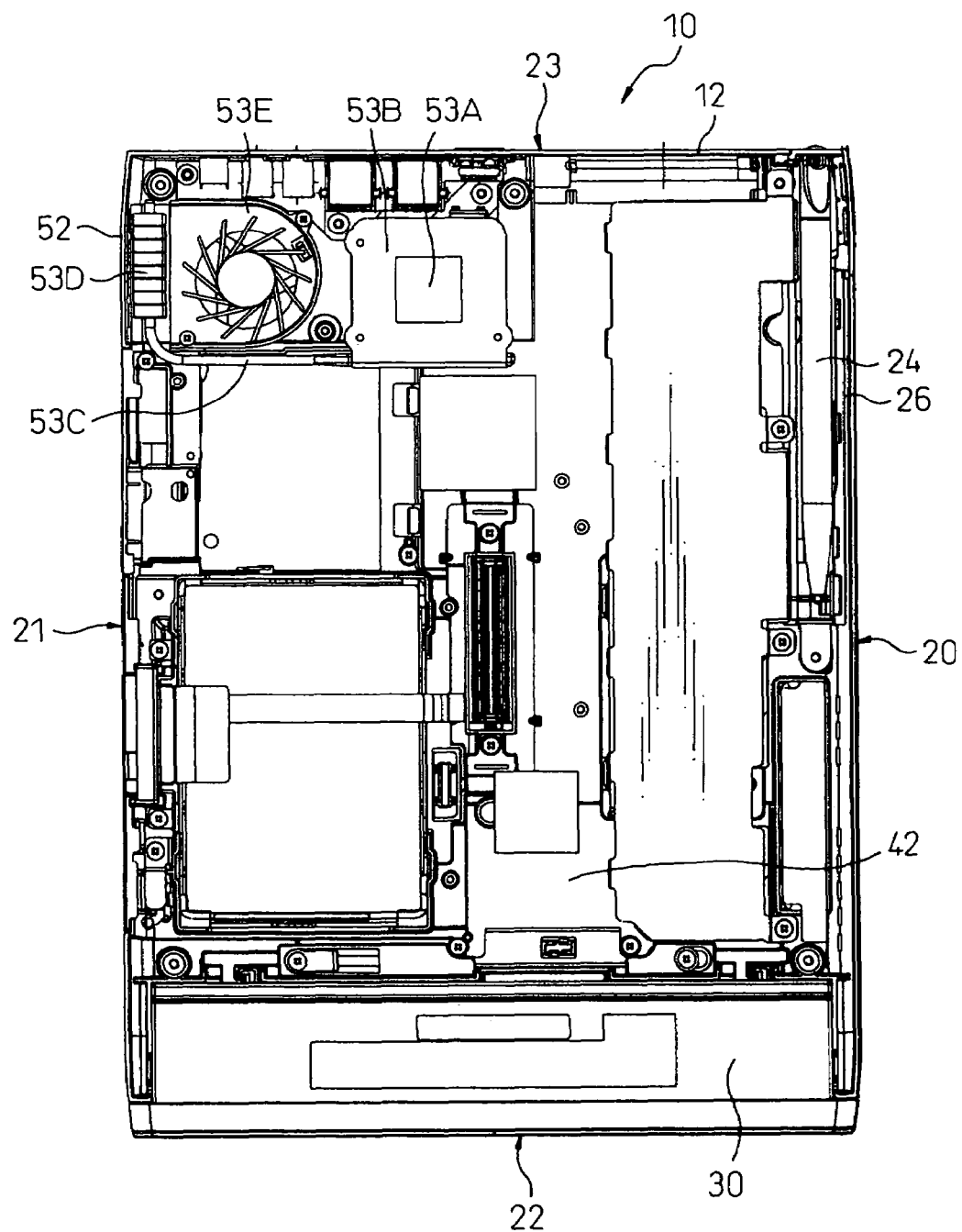
FIG. 5 is a plan view showing the inside of the tablet PC.

The tablet PC 10 is a personal computer to which information or data can be input with a pen 24. FIG. 5 is a plan view showing the inside of the tablet PC. The pen 24 is accommodated in a penholder 26 provided along the first long side portion 20. The penholder 26 is a substantially cylindrically shaped container which opens toward the second short side portion 23, and extends downward from the upper end of the first ling side portion 20 to the middle part of the first long side portion 20. The pen 24 is taken out from the penholder 26 when it is used. For example, the pen 24 has a coil and the body 12 has an antenna. Data input can be performed with the pen 24 by the interaction between the antenna and the coil. Data can be input to the tablet PC 10 by clicking the pen 24 toward the display 18 or allowing the pen 24 to make contact with the display portion 18.

A battery 28 is disposed at the first short side portion 22 of the body 12 so as to overlap with the upper cover 14. As shown in FIG. 4, a battery-accommodating portion 30 is disposed at the first short portion 22 of the body 12, and the battery 28 is inserted in the battery-accommodating portion 30 of the first short portion 22 of the body 12 as shown by the arrow.

The battery-accommodating portion 30 has an end wall 31 having an opening 31A. The bottom wall of the lower cover 16 terminates at the end wall 31 of the battery-accommodating portion 30, and the upper cover 14 extends beyond the end wall 31 of the battery-accommodating portion 30. Thus, in the state that the battery 28 is attached to the body 12, the battery 28 overlaps with the upper cover 14 but is substantially exposed from the bottom wall of the lower cover 16. The width of the battery 28 is nearly equal to that of the body 12.

For example, supposing that the battery 28 is disposed in the body 12, the battery 28 may be arranged to overlap with the electronic components in the body, and thereby total thickness of the body increases and the weight of it increases accordingly. On the other hand, in the case that the battery 28 is disposed at the first short side portion 22 of the body 12, the battery 28 can be disposed on the same level as the electronic components in the body so that it does not overlap with the electronic components and, thereby, the thickness of the body can be reduced to a value nearly equal to the thickness of the battery 28 and the weight of the body can be reduced accordingly. Also, by arranging the battery 28 to overlap with the upper cover 14, the strength of the portion around the battery 28 may be increased, compared with the case where the battery 28 is simply disposed at the side of the body 12.

Figure 6:
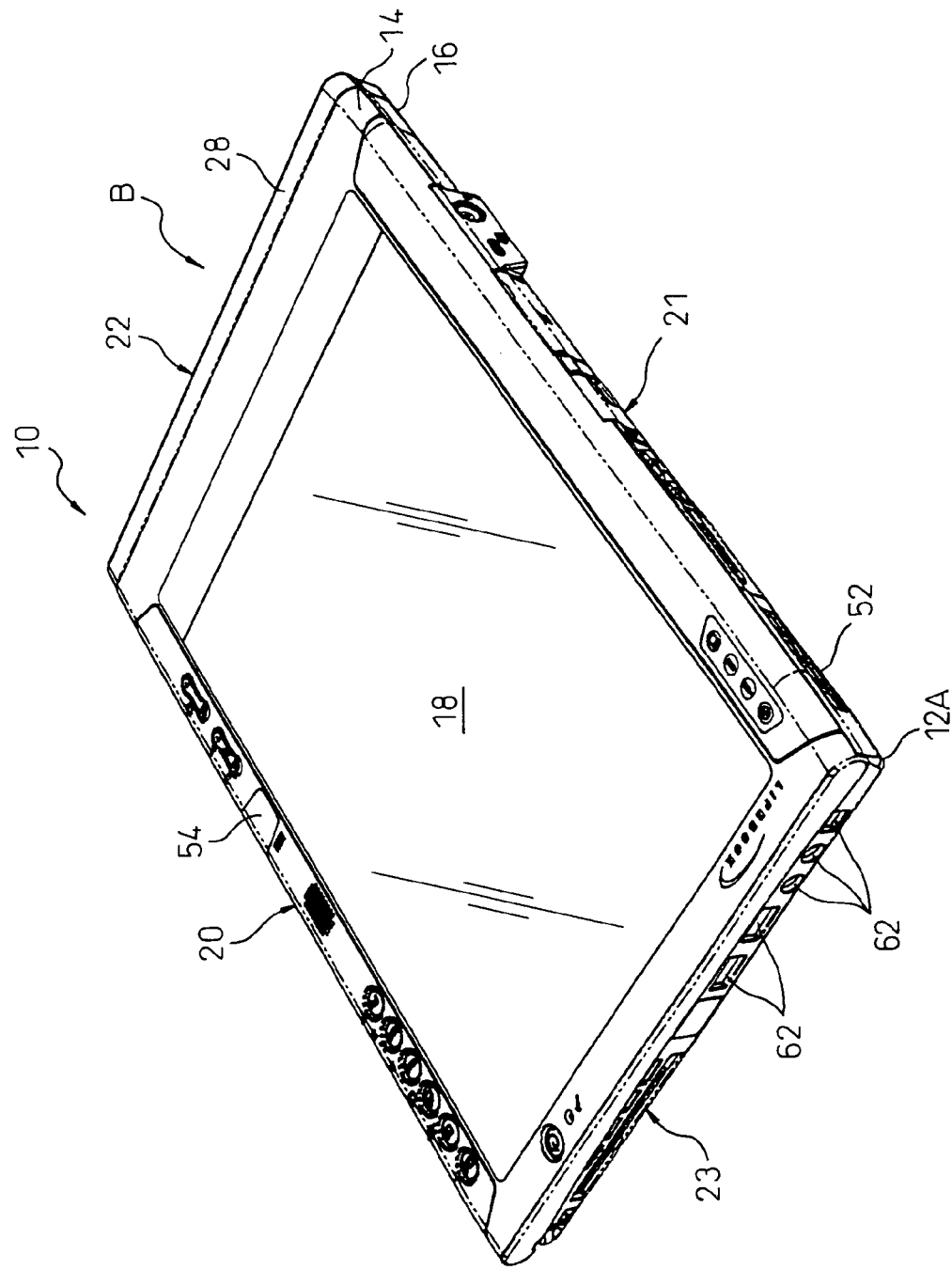
FIG. 6 is a perspective view of the tablet PC seen from the corner portion between the second short portion and the second long side portion shown in FIG. 1.

FIG. 6 is a perspective view of the tablet PC, seen from the corner portion 12A between the second short portion 23 and the second long side portion 21 of FIG. 1. An air outlet opening 52 is disposed at or near the corner portion 12A between the second short portion 23 and the second long side portion 21 of the body 12.

FIG. 5 shows a heat sink and a fan disposed in the body. A CPU 53A is disposed in the body. The CPU 53A generates heat when it is used. A heat sink 53B is disposed in contact with the CPU 53A, and a heat pipe 53C is so disposed that one end of it is in contact with the heat sink 53*b*. Fins 53D are disposed at the other end of the curved heat pipe 53C, and a fan 53E is disposed so as to deliver cooling air in parallel with the fins 53D. The fan 53E produces a flow of cooling air toward the air outlet 52.

As shown in FIGS. 1 and 6, a receiving means for radio communication is disposed at the middle part of the first long side portion 20. The receiving means 54 for radio communication is provided at a position with a short distance from the tip of the penholder 26 accommodating the pen 24 toward the first short side portion 22. The receiving means 54 for radio communication is designed to receive a radio signal transmitted from a keyboard or a mouse. In this embodiment, the keyboard and the mouse transmit an infrared ray signal, and the receiving means 54 of radio communication contains an infrared ray receiving device 54a.

Figure 7:
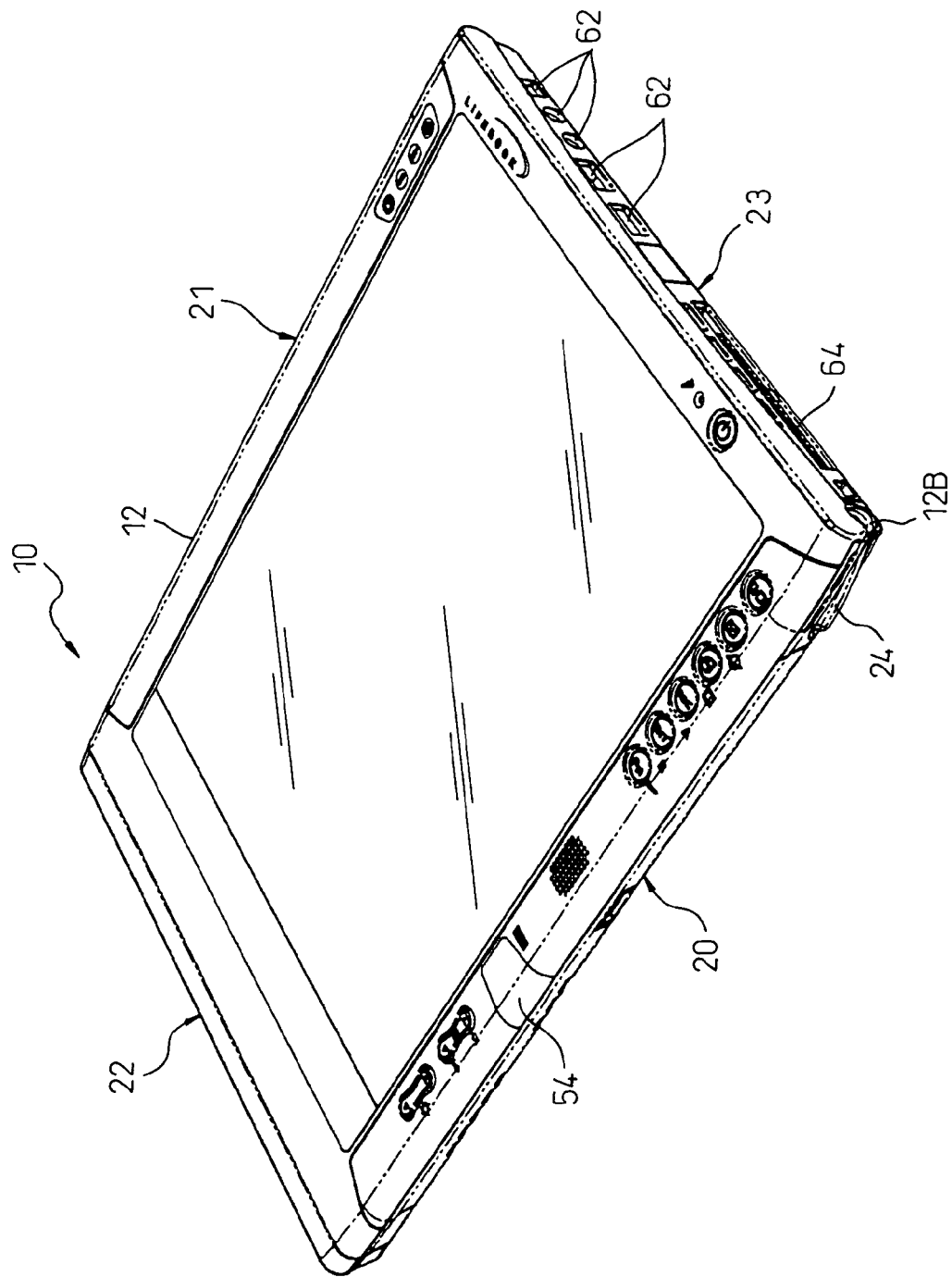
FIG. 7 is a perspective view of the tablet PC, seen from the corner portion between the first long side portion and the second short side portion of FIG. 1.

FIG. 7 is a perspective view of the tablet PC, seen from the corner portion 12B between the first long side portion 20 and the second short side portion 23 of FIG. 1. The pen 24 is disposed at the first long side portion 20.

Figure 8:
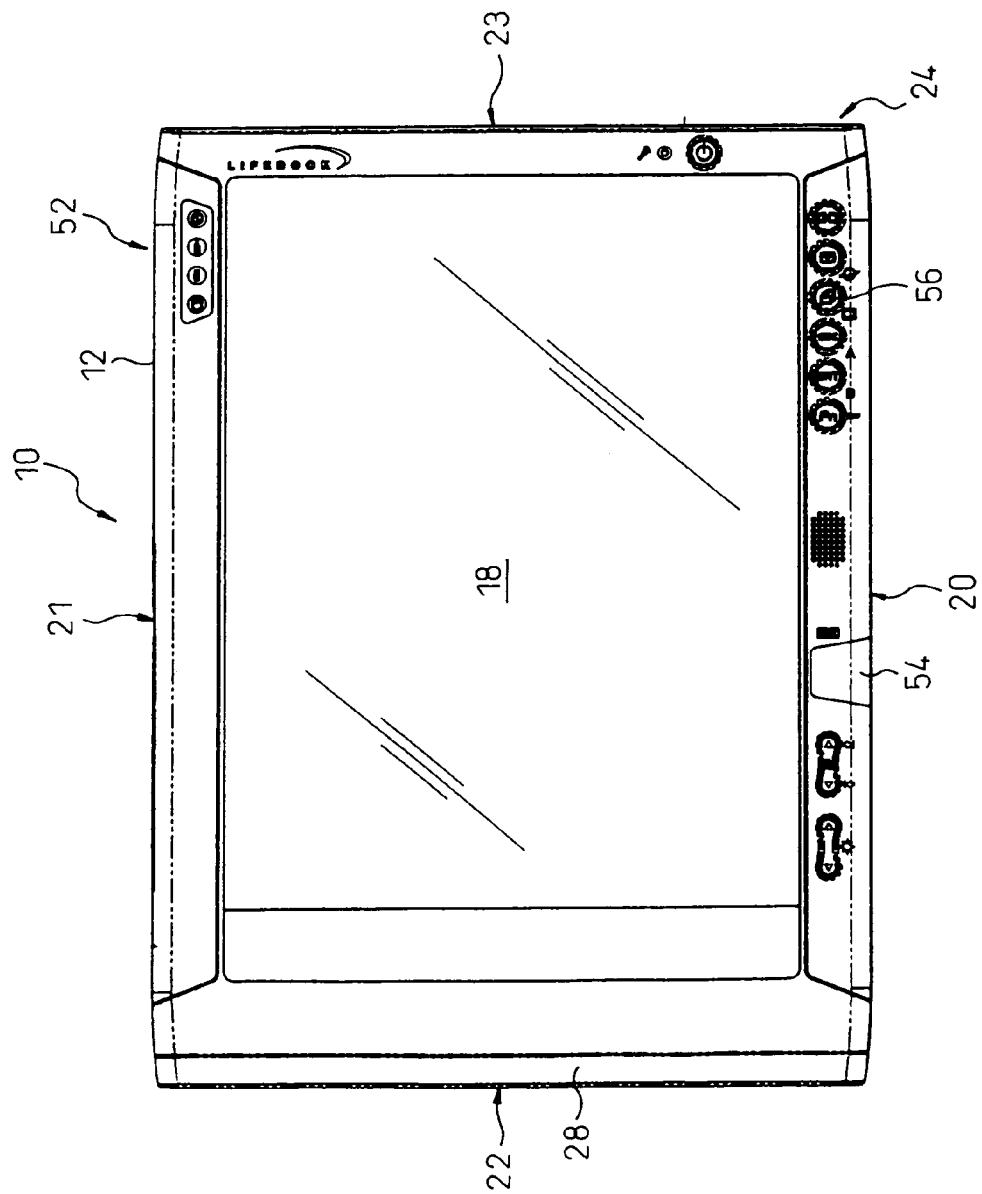
FIG. 8 is a plan view of the tablet PC used in the horizontal position.

FIG. 8 is a plan view of the tablet PC 10 used in the horizontal position. When the tablet PC 10 is used in the horizontal position, as shown in FIG. 8, the first long side portion 20 at which the pen 24 is disposed is positioned at the bottom of the tablet PC 10, and the second long side portion 21 is positioned at the top of the tablet PC 10. In this case, the screen of the display portion 18 is extended horizontally. Data input can be performed with the pen 24 while holding the first long side portion 20 with a hand. The pen 24 can be taken out easily from the penholder 26 with the right hand. Furthermore, as the air outlet opening 52 is disposed at the second long side portion 21 positioned at the top of the tablet PC 10, heated air flows upward and then flows out of the air outlet opening 52.

Figure 9:
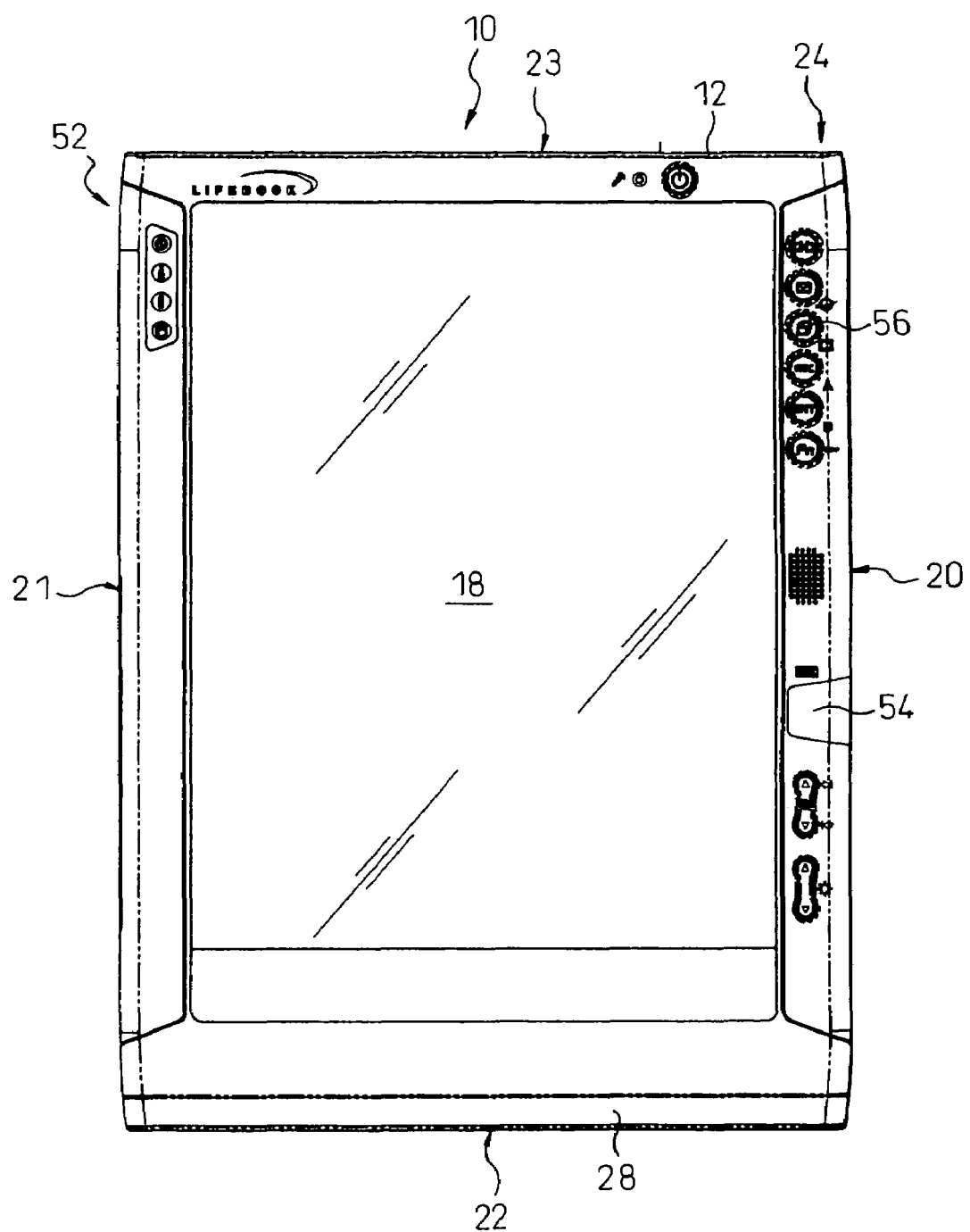
FIG. 9 is a plan view of the tablet PC used in the vertical position.

FIG. 9 is a plan view of the tablet PC 10 used in the vertical position. When the tablet PC 10 is used in the vertical position, as shown in FIG. 9, the first short side portion 22 at which the battery 28 is disposed is positioned at the bottom of the tablet PC 10, and the second short side portion 23 is positioned at the top of the tablet PC 10. In this case, the screen of the display 18 is extended vertically. Data input can be performed with the pen 24 while holding the first short side portion 22 with a hand. The pen 24 can also be taken out easily from the penholder 26 with the right hand. Furthermore, as the air outlet opening 52 is disposed near the upper end of the second long side portion 21, heated air flows upward and then flows out of the air outlet opening 52.

As shown in FIGS. 8 and 9, a plurality of operation buttons are arranged on the surface of the body 12. When one of the operation buttons 56 is pushed, a display in the display portion 18 changes between a display suitable for using the tablet PC 10 in the horizontal position and a display suitable for using the tablet PC 10 in the vertical position. Software capable of changing a display in this manner is distributed by, for example, Microsoft Corporation.

The tablet PC 10 further comprises a plurality of I/O connectors. As shown in FIG. 3, many I/O connectors 58 are disposed at the second long side portion 21. For example, a radio communication LAN antenna 58a, a MODEM connector 58b, a LAN connector 58c, a VGA connector 58d, and an AC adapter 58e are disposed at the second long side portion 21. In addition, a security keyhole 60 is provided in the second long side portion 21.

Also, as shown in FIG. 7, a plurality of I/O connectors 62 are disposed at the second short side portion 23. For example, these I/O connectors 62 include an IEEE 1394 connector, a headphone connector, a microphone connector, an infrared light port, an USB connector, etc. A PC card slot is also disposed at the second short side portion 23. In this way, the battery 28 and the penholder 26 are disposed at two side portions (the short side portion 22 and the long side portion 20) respectively in the four side portions 20, 21, 22, and 23 of the body 12 so that one of the side portions can be held with a hand, and the connectors 58 and the connectors 62 are disposed at two side portions (the long side portion 21 and the short side portion 23) respectively so that force is not applied to the connectors 58 and the connectors 62 by a hand.

The present invention will be described in more detail with reference to FIGS. 10 to 19.

Figure 10:
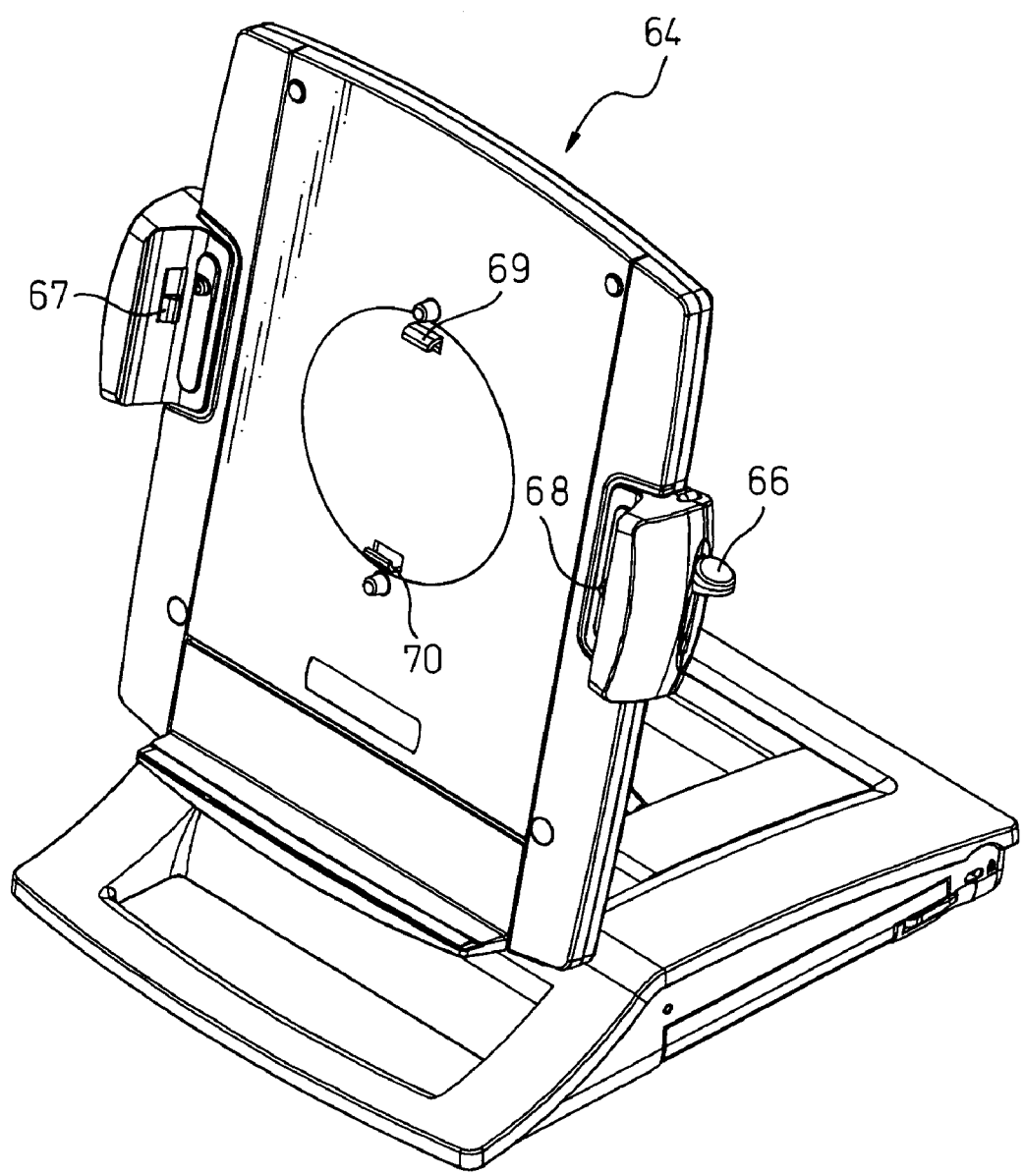
FIG. 10 is a perspective view of the docking unit capable of supporting the tablet PC.
Figure 11:
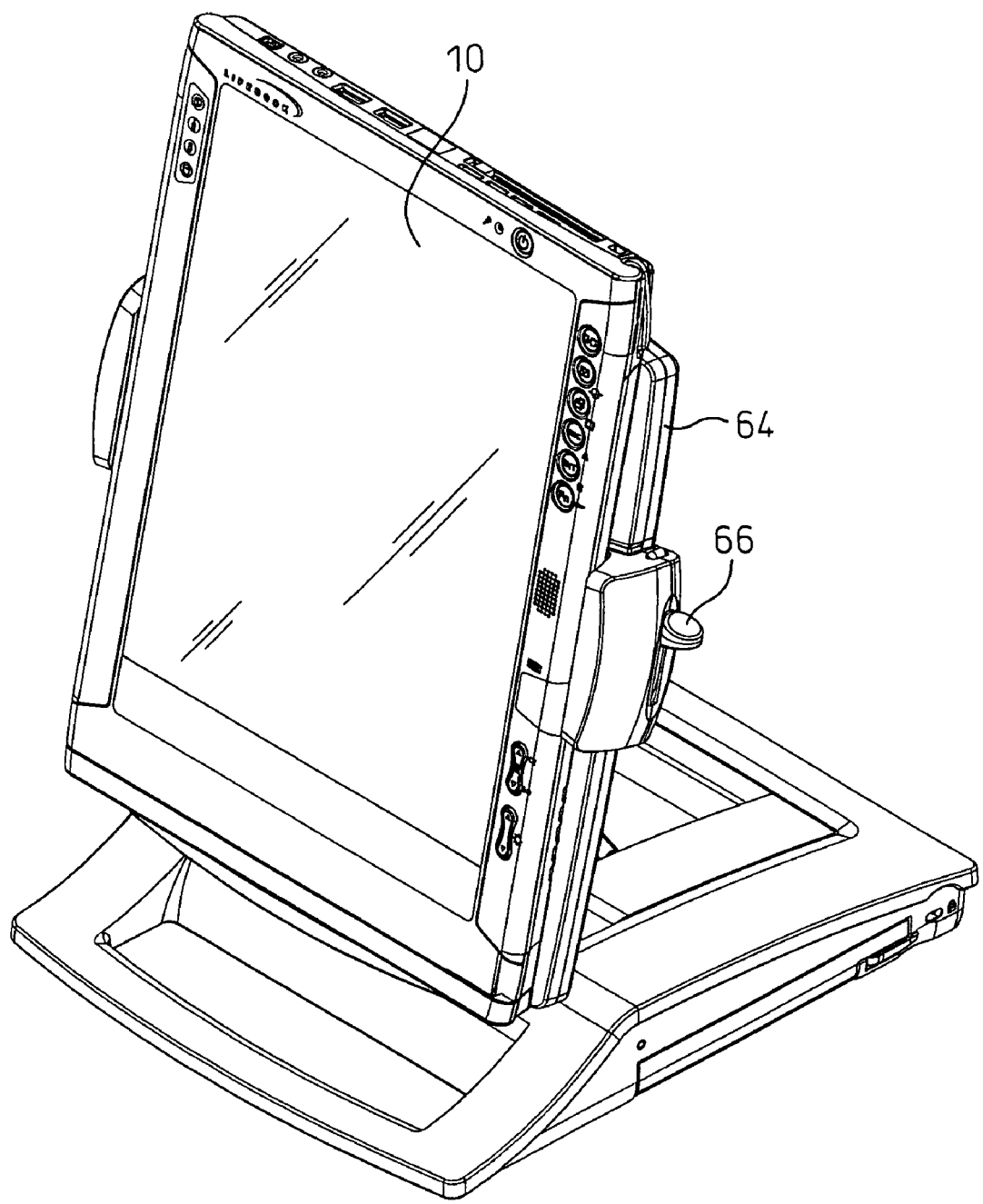
FIG. 11 is a perspective view of the docking unit supporting the tablet PC.

FIG. 10 is a perspective view of a docking unit 64 which is capable of supporting the tablet PC 10. FIG. 11 is a perspective view of the docking unit 64 supporting the tablet PC 10. The docking unit 64 is made of resin. The tablet PC 10 can be used not only while being held with a hand as described above, but also in the state that it is attached to the docking unit 64. The docking unit 64 not only supports the tablet PC 10 but also extends the functions of the tablet PC 10.

As shown in FIG. 10, the docking unit 64 has a lever 66 and claws 67, 68, 69, and 70 to releasably hold the body 12.

Figure 12:
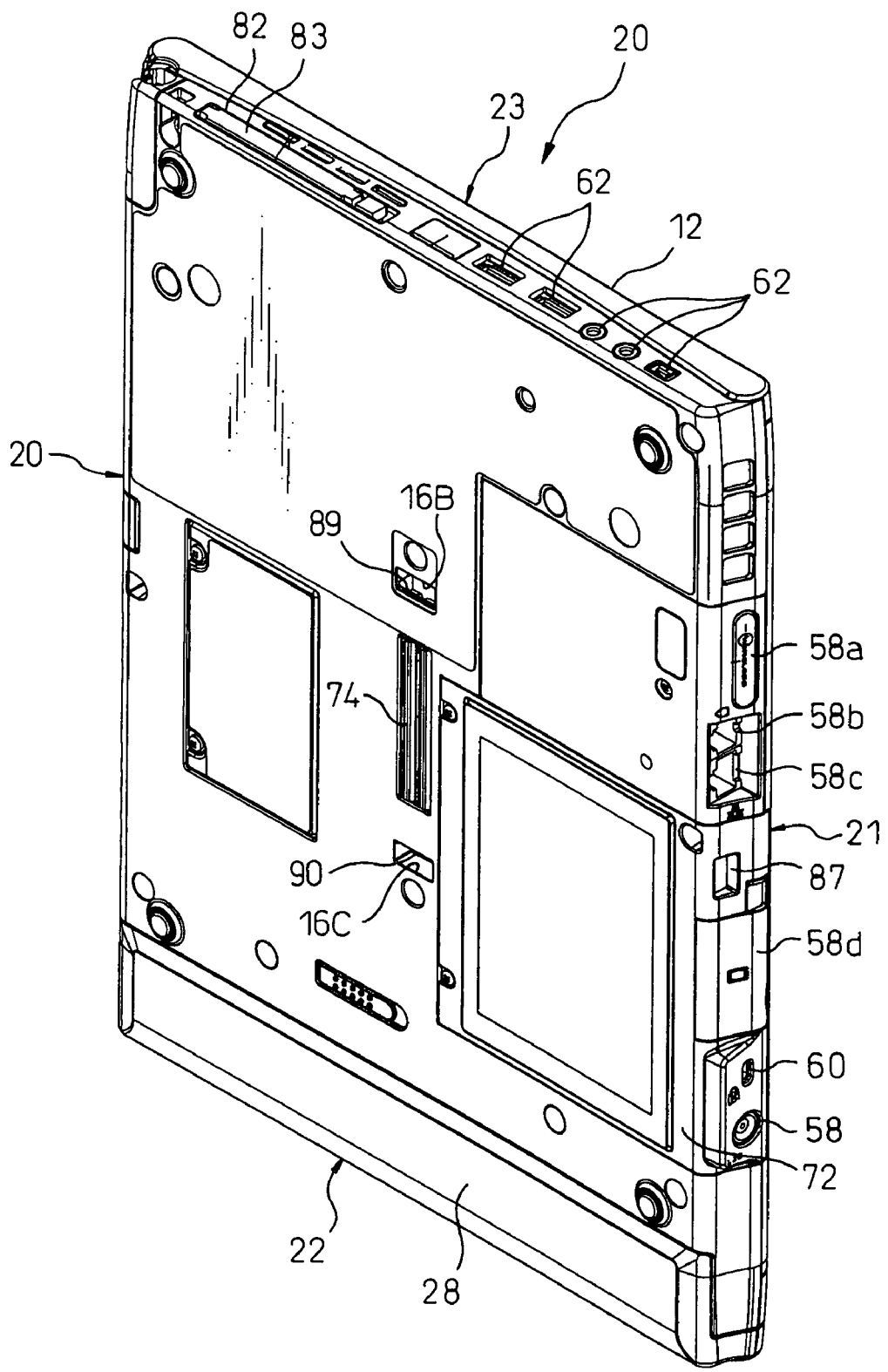
FIG. 12 is a perspective view of the tablet PC of FIG. 3, seen from the corner between the second long side portion and the second short side portion.
Figure 13:
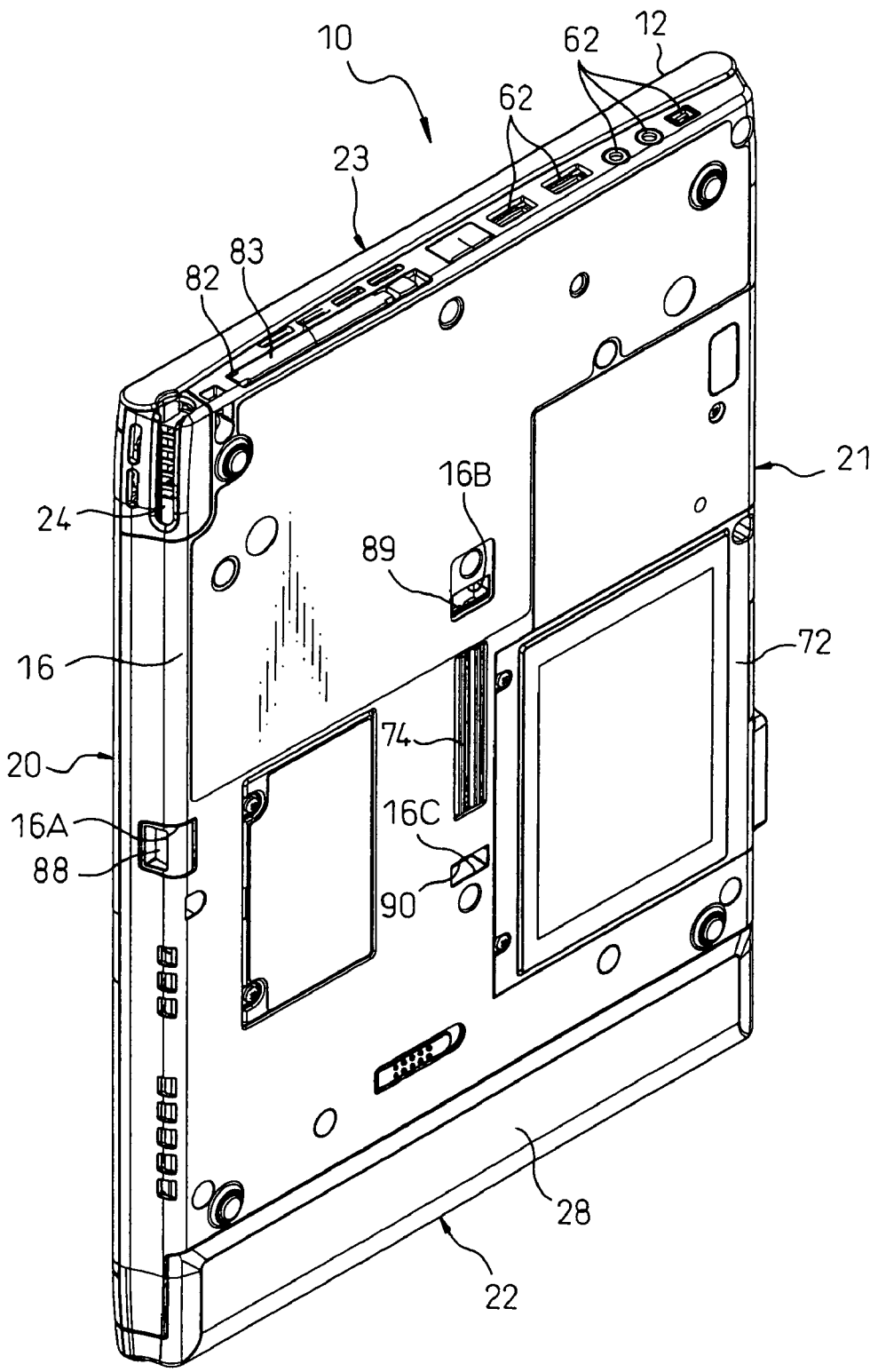
FIG. 13 is a perspective view of the tablet PC of FIG. 12, seen from the corner between the first long side portion and the second short side portion.

FIG. 12 is a perspective view of the tablet PC of FIG. 3, seen from the corner between the second long side portion 21 and the second short side portion 23. FIG. 13 is a perspective view of the tablet PC of FIG. 12, seen from the corner between the first long side portion 20 and the second short side portion 23. As shown in FIGS. 12 and 13, the body 12 has engaging concave portions 87, 88, 89, and 90 capable of engaging with the claws 67, 68, 69, and 70 of the docking unit 64. When the lever 66 is operated, the claws 67, 68, 69, and 70 engage with the engaging concave portions 87, 88, 89, and 90, respectively, so that the tablet PC 10 is fixed to the docking unit 64.

FIG. 14 is a perspective view showing the tablet PC 10, in the state that a cover 72 covering a storage device (HDD) 71 is opened. The cover 72 covering the storage device (HDD) 71 shown in FIGS. 12 to 14 is a molded resin member and is disposed at the back of the body 12. The cover 72 can be moved in the direction (shown with the arrow in FIG. 14) perpendicular to the second long side portion 21 to open and close the storage device (HDD) 71.

The engaging concave portion 87 is provided in the sidewall portion of the cover 72. The claw 67 is capable of engaging with the engaging concave portion 67. The engaging concave portion 88 shown in FIG. 13 is provided in the penholder 26 shown in FIG. 5. The penholder 26 is disposed in the body 12. The lower cover 16 of the body 12 has an opening 16A at which the engaging concave portion 88 is exposed. Access of the pin 68 to the engaging concave portion 88 in the penholder 26 is made through the opening 16A.

The engaging concave portions 89 and 90 are provided in the flap base 76 (see FIGS. 15A and 15B) having a flap 74. As shown in FIGS. 12 to 14, the flap 74 is disposed at the center part of the back of the body 12, and is exposed at an opening of the lower cover 16 of the body 12. The flap 74 covers an electronic component such as a connector in the body 12. The flap base 76 is disposed in the body 12. The lower cover 16 has openings 16B and 16C near the both ends of the flap 74. Access by the claws 69 and 70 to the engaging concave portions 89 and 90 is made through the openings 16B and 16C of the lower cover 16, respectively.

FIG. 15A is a plan view of the flap base 76 supporting the flap 74, and FIG. 15B is a side view of the flap base 76. FIG. 16 is a longitudinal cross-sectional view showing the flap base 76 and the lower cover 16. The flat base 76 pivotally supports the flap 74, and is fixed to the lower cover 16 with screws. Each end portion of the flap base 76 is formed in the form of a box which opens in the horizontal direction as shown in FIG. 15B, and opens to the outside in the longitudinal direction as shown in FIG. 16. Each end portion of the flap base 76 forms the engaging concave portion 89 or 90. The openings 16B and 16C of the lower cover 16 are disposed slightly outside the engaging concave portions 89 and 90, respectively. The claws 69 and 70 come into the openings 16B and 16C of the lower cover 16 respectively from under the tablet PC 10, and then engage with the engaging concave portions 89 and 90, respectively.

In this manner, the tablet PC 10 comprises the rectangular magnesium body 12, and molded resin components 26, 72, and 76 having predetermined functions attached to the body 12, wherein the molded resin components 26, 72, and 76 have engaging concave portions 88, 87, and 89 and 90 for releasably securing the body 12 to the docking unit 64.

The body 12 is made of magnesium, and magnesium is suitable for fabricating a thin and light body because it has high strength. However, if the magnesium body 12 makes sliding contact with other components, the paint coating provided on the magnesium body 12 is apt to peel off, or the surface of the magnesium body 12 is apt to be damaged. In the present invention, portions (engaging concave portions 87, 88, 89, and 90) of the body 12 engaging with other components (claws 67, 68, 69, and 70 of the docking unit 64) are made of resin to thereby solve the problems that the coating provided on the magnesium body is apt to peel off, or the surface of the magnesium body 12 is apt to be damaged. Consequently, the weak point of magnesium can be avoided while taking advantage of the strong points of magnesium. In particular, the engaging concave portions 87, 88, 89, and 90 are not made as special molded resin components, but are made as part of components having different functions, with the result that the number of components are not increased, assembling work will not become difficult, and the manufacturing cost can be reduced.

Furthermore, in FIG. 14, a security key 78 as a lock is shown. The first keyhole 60 for the security key 78 is provided in the cover 72 covering the storage device (HDD) 71. And a second keyhole 80 is provided in the sidewall of the lower cover 16 of the body 12. The security key 78 is inserted through the first keyhole 60 and the second keyhole 80 and locked. Thus, the security key 78 locks the cover 72 together with the body 12. The security key 78 is tied to an appropriate object such as a desk with a chain or a rope (not shown).

In this configuration, the body 12 of the tablet PC 10 is made of magnesium, and the cover 72 covering the storage device is made of a molded resin component. The security key 78 is used for the purpose of tying the body 12 to, for example, a desk so that the tablet PC 10 is not taken away. The storage device 71 such as a HDD is very important for the user of the tablet PC, who is greatly troubled when it is taken out from the body 12. However, as the cover 72 covering the storage device is locked along with the magnesium body 12 by the security key 78, the cover 72 cannot be opened and the storage device 71 such as a HDD cannot be stolen. When the cover 72 is made of a molded resin component and the thickness of the wall of it is small, the strength with respect to the lock may be insufficient, but in the present invention, as the cover 72 is stacked on the sidewall of the magnesium body 12 and locked together, the strength of the cover 72 with respect to the lock is sufficient.

As shown in FIGS. 12 and 13, a PC card slot 82 is provided in the lower cover 16 of the body 12. A flap 83 is disposed in such a manner that it is capable of opening and closing the PC card slot 82.

Figure 17:
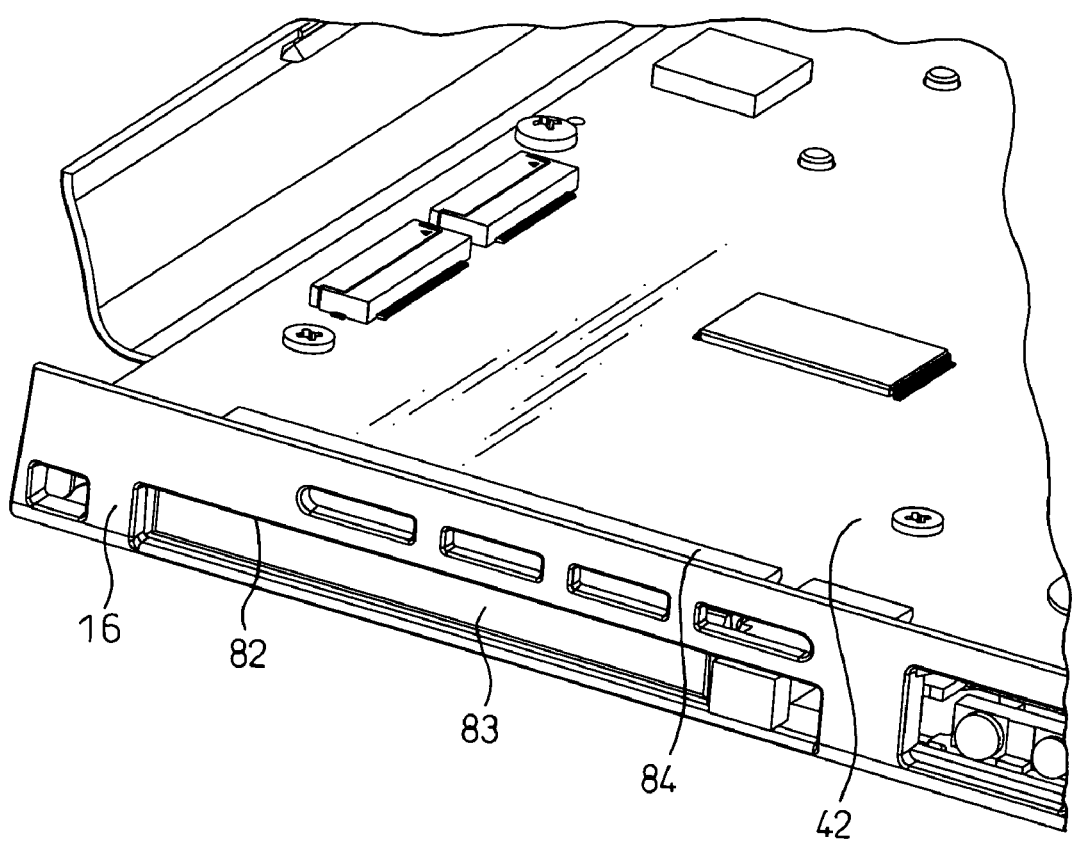
FIG. 17 is an enlarged perspective view of part of the body including a PC card slot.
Figure 18:
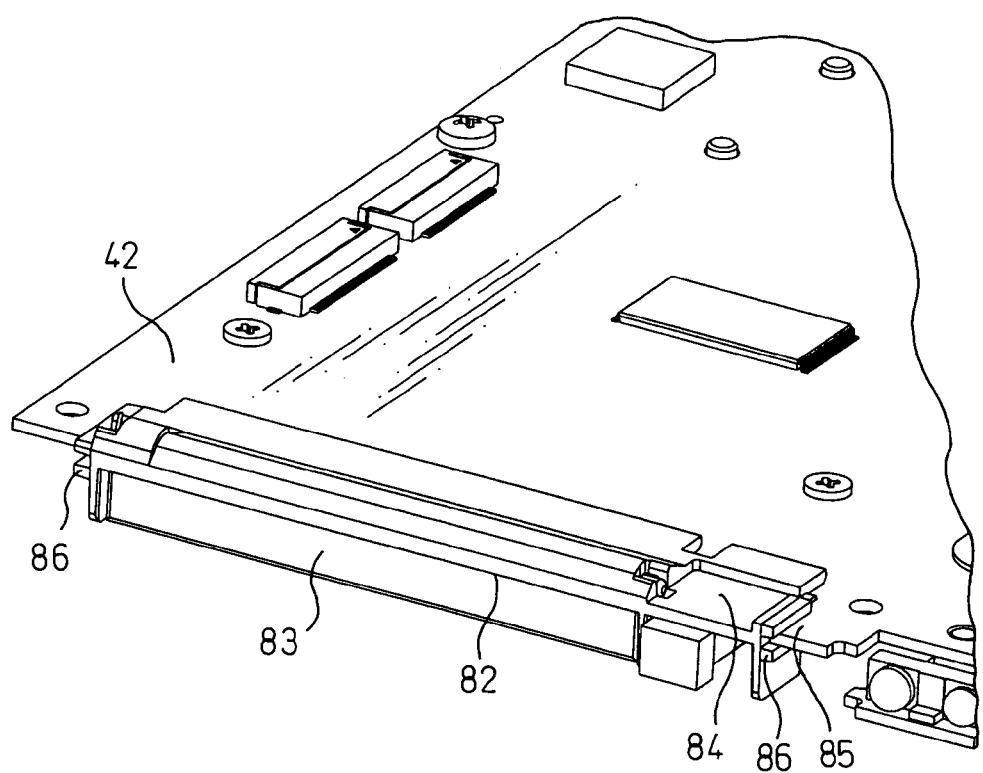
FIG. 18 is a perspective view showing the flap unit having a flap, and the printed circuit board.

FIG. 17 is an enlarged perspective view of part of the body including the PC card slot 82. FIG. 18 is a perspective view showing a flap unit 84 having the flap 83, and the printed circuit board 42. FIG. 19 is a perspective view showing the flap unit 84 which is being attached to the printed circuit board 42.

As shown in FIGS. 17 to 19, the PC card slot 82 comprises an opening portion of the lower cover 16, an opening portion around the flap 83 of the flap unit 84, and a case-like portion attached to the printed circuit board 42. In the case-like portion of the PC card slot 82, a connector engaging with a connector of a PC card is provided.

The flap unit 84 is attached to the printed circuit board 42. The printed circuit board 42 has a pair of parallel guides 85, and each of the side portions of the flap unit 84 has a guide slot 86. Thus, the flap unit 84 can be attached to the printed circuit board 42 by sliding the guide slots 86 along the guides 85. Each of is the guides 85 has a positioning notch 85A, and each of the guide slots 86 has a positioning protrusion 86A. The flap unit 84 is held by the printed circuit board 42 in the state that the positioning protrusions 86A are engaged with the positioning notches 85A.

In this configuration, the body 12 of the tablet PC 10 is made of magnesium, and the flap unit 84 is made of a molded resin component. A flap or flap unit is usually attached to the body, but the flap unit 84 in this configuration is attached to the printed circuit board 42. For this reason, the flap unit 84 can be positioned accurately with respect to the printed circuit board 42, and, when a PC card is inserted into the PC card slot 82, the connector of the PC card is connected to the connector in the case-like portion of the PC card slot 82 of the printed circuit board 42 without any problem.

As described above, in the present invention, the body is made of magnesium and the molded resin components are attached to the body, and thereby the problems of a magnesium body can be solved. In particular, when the molded resin component has an engaging portion for releasably holding the body to the docking unit, the coating provided on the magnesium body does not peel off and the surface of the magnesium body is not damaged. Furthermore, when the lock is provided for the purpose of locking the cover covering the storage device along with the body, the tablet PC and the storage device can be protected from being stolen, and the strength of the cover made of the molded resin component with respect to the lock is sufficient, while using a minimum number of components. Furthermore, when the molded resin flap unit supporting the flap capable of opening and closing the PC card slot is attached to the printed circuit board, a molding die for producing the body can be easily made, and the positional accuracy between the flap unit and the printed circuit board for the engagement of the connectors can be secured reliably.

What is claimed is:

1. An information processing apparatus comprising:
   a magnesium body; and
   a molded resin component attached to said body, the molded resin component having an engaging portion for releasably securing said body to a docking unit,
   wherein said molded resin component comprises at least one of a cover for covering a storage device, a penholder for accommodating a pen, and a component for supporting a flap.

2. The information processing apparatus according to claim 1, wherein said molded resin component has a first portion having a function, and a second portion different from said first portion and adapted for engaging with the docking unit.

3. The information processing apparatus according to claim 1, wherein said magnesium body has a rectangular shape.

4. An information processing apparatus comprising:
a magnesium body;
a molded resin component attached to said body; and
a docking unit for releasably supporting said body, the molded resin component having an engaging portion for releasably securing said body to said docking unit,
wherein said molded resin component comprises at least one of a cover for covering a storage device, a penholder for accommodating a pen, and a component for supporting a flap.

5. The information processing apparatus according to claim 4, wherein said magnesium body has a rectangular shape.

6. An information processing apparatus comprising:
a magnesium body;
a storage device;
a molded resin cover covering said storage device; and
a security key to be tied to an object other than the information processing apparatus, the security key the security key being arranged to lock said cover together with said body.

7. The information processing apparatus according to claim 6, wherein said magnesium body has a rectangular shape.

* * * * *

UNITED STATES PATENT AND TRADEMARK OFFICE
CERTIFICATE OF CORRECTION

PATENT NO. : 7,016,181 B2  
APPLICATION NO. : 10/458788  
DATED : March 21, 2006  
INVENTOR(S) : Ito et al.

It is certified that error appears in the above-identified patent and that said Letters Patent is hereby corrected as shown below:

Col. 10, lines 6-7, delete "the security key".

Signed and Sealed this

Second Day of October, 2007

JON W. DUDAS  
*Director of the United States Patent and Trademark Office*